(12) United States Patent
Suzuki

(10) Patent No.: US 6,850,648 B2
(45) Date of Patent: Feb. 1, 2005

(54) SYSTEM FOR DECODING PACKED CODED IMAGE DATA WHILE DEPACKING SAME

(75) Inventor: Kojiro Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 609 days.

(21) Appl. No.: 10/000,081

(22) Filed: Dec. 4, 2001

(65) Prior Publication Data

US 2003/0059118 A1 Mar. 27, 2003

(30) Foreign Application Priority Data

Sep. 27, 2001 (JP) ........................................ 2001-296243

(51) Int. Cl.⁷ ............................. G06K 9/36; G06K 9/46
(52) U.S. Cl. ..................................... 382/233; 382/246
(58) Field of Search ................................. 382/233, 246, 382/250; 341/67; 375/240.25

(56) References Cited

U.S. PATENT DOCUMENTS

| | | | | |
|---|---|---|---|---|
| 5,148,272 A | * | 9/1992 | Acampora et al. | 375/240.1 |
| 5,220,325 A | * | 6/1993 | Ackland et al. | 341/67 |
| 5,606,370 A | * | 2/1997 | Moon | 375/240.23 |
| 6,546,053 B1 | * | 4/2003 | Ishii | 382/248 |

FOREIGN PATENT DOCUMENTS

JP 8-275162 10/1996

* cited by examiner

Primary Examiner—Phuoc Tran
(74) Attorney, Agent, or Firm—Oblon, Spivak, McClelland, Maier & Neustadt, P.C.

(57) ABSTRACT

A coded image data decoding system is designed to depack and variable-length decode image data packed by an image compressing/decompressing format wherein the sum of the length of components other than variable-length code components in one block and the length of an end code is not shorter than a bit length obtained by subtracting 1 bit from the number of bits of the maximum length of variable-length code words. This decoding system comprises: a main memory for storing code strings for one video segment; a decoding circuit for variable-length decoding code strings outputted from the main memory; a block storing circuit, provided between the main memory and the decoding circuit so as to be capable of storing code strings for one block, for storing code strings for concatenated two blocks; and a depacking circuit, including the block storing circuit, for suitably combining required portions of sequentially supplied code strings to complete code strings for one block when code strings supplied from the main memory are not code strings for one block.

20 Claims, 15 Drawing Sheets

| ITEMS | BUFFER MEMORY CAPACITY | ACCESS FREQUENCY OF MAIN MEMORY |
|---|---|---|
| GENERAL METHOD | (4400bit) | — |
| JPA.No 8-275162 (WITH BUFFER) | (3040bit) | LOW |
| JPA.No 8-275162 (WITHOUT BUFFER) | (~0bit) | HIGH |
| EMBODIMENT OF THIS INVENTION | (112bit) | LOW |

FIG.3

LONGEST REMAINDER WHEN EOB IS DETECTED

THERE IS EOB IMMEDIATELY AFTER DC COMPONENTS.
16 BIT ARE EMPTY, OTHER IS REMAINDER

LONGEST REMAINDER WHEN EOB IS NOT DETECTED

WHEN LONGEST CODE (16 BIT) IS NOT INCLUDED,
REMAINDER IS 15 BIT.

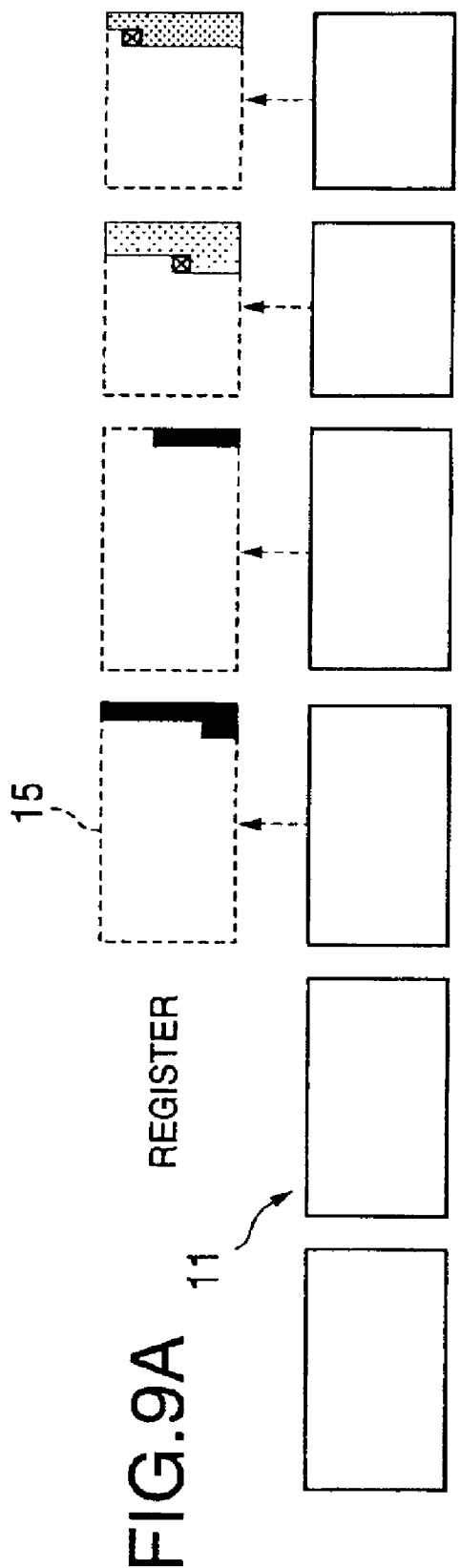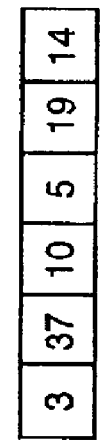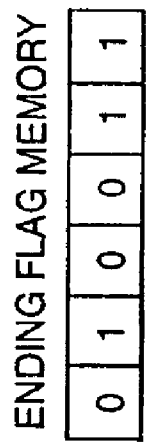

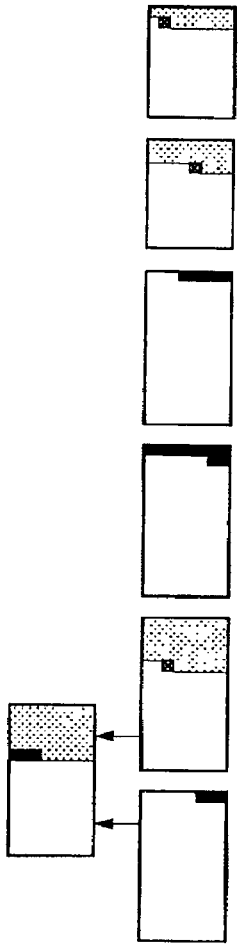
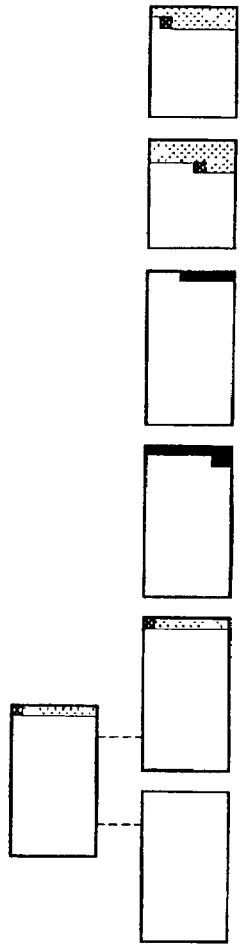

FIG.12B  ADDRESS STORING CIRCUIT
| 0 | 7 | 10 | 5 | 19 | 14 | ~21

FIG.12C  ENDING FLAG MEMORY
| 1 | 1 | 0 | 0 | 1 | 1 | ~22

FIG.13B  ADDRESS STORING CIRCUIT
| 0 | 0 | 4 | 5 | 19 | 14 | ~21

FIG.13C  ENDING FLAG MEMORY
| 1 | 1 | 0 | 0 | 1 | 1 | ~22

ADDRESS STORING CIRCUIT

FIG.14B  | 0 | 0 | 4 | 5 | 19 | 14 | ~21

ENDING FLAG MEMORY

FIG.14C  | 1 | 1 | 0 | 0 | 1 | 1 | ~22

ADDRESS STORING CIRCUIT

FIG.15B  | 0 | 0 | 6 | 5 | 0 | 14 | ~21

ENDING FLAG MEMORY

FIG.15C  | 1 | 1 | 0 | 0 | 1 | 1 | ~22

ADDRESS STORING CIRCUIT
FIG.16B | 0 | 0 | 6 | 5 | 0 | 14 | ~21

ENDING FLAG MEMORY
FIG.16C | 1 | 1 | 0 | 0 | 1 | 1 | ~22

ADDRESS STORING CIRCUIT
FIG.17B | 0 | 0 | 2 | 5 | 0 | 0 | ~21

ENDING FLAG MEMORY
FIG.17C | 1 | 1 | 0 | 0 | 1 | 1 | ~22

MEMORY ACCESS FREQUENCY IN PRIOR ART

MEMORY ACCESS FREQUENCY OF THIS INVENTION

COMPARISON OF ACCESS FREQUENCY

SYSTEM FOR DECODING PACKED CODED IMAGE DATA WHILE DEPACKING SAME

CROSS REFERENCE TO RELATED APPLICATION

This application claims benefit of priority under 35 USC §119 to Japanese Patent Application No.2001-296243, filed on Sep. 27, 2001, the entire contents of which are incorporated by references herein.

BACKGROUND OF THE INVENTION

The present invention relates generally to an image decoding system. More specifically, the invention relates to an image decoding system for decoding packed data while depacking the data.

In image coding and decoding techniques, a packing/depacking processing means a processing for cutting a long variable-length code, which has a length exceeding the upper limit to length, in the middle thereof to store the cut code in a block having left capacity, in order to store variable-length codes, which have different lengths every block, in an area having a predetermined capacity, and means a so-called "processing for accommodating a data storing capacity of one block to that of the other block".

It is supposed that the packing/depacking processing according to the present invention uses, e.g., a "DV format", i.e., a format of a system called DVC (Digital VCR for Consumer use) standardized by "HD digital VCR Conference". However, the format used for the packing/depacking processing according to the present invention should not always be limited to the above described format, but the invention may be widely applied to a processing for depacking a variable-length coded image data packed by another predetermined format.

Since the details of the packing/depacking processing is described in required documents (e.g., "Illustrated Digital Video Reader" written and edited by Kubota, etc.), see these documents.

The depacking processing is a processing for cutting/concatenating data, which are divided to be stored in a plurality of blocks, to reproduce the original variable-length code string. However, if an inverse processing to packing is simply carried out, it is required to provide a memory (about 4400 bits) for temporarily storing concatenated data. Therefore, a system for realizing memory saving by avoiding insuring a memory to the utmost and by using many pointer operations has been proposed in, e.g., Japanese Patent Laid-Open No. 8-275162.

This conventional decoding circuit is shown in FIG. 1. In FIG. 1, code data inputted to a buffer memory 2 from a main memory 1 are supplied to a barrel shifter 3 every byte by byte information from a code address storing circuit (not shown). A decoding circuit 4 comprises the barrel shifter 3 and a variable-length code table 5. The barrel shifter 3 is designed to shift code data, which have not been decoded, by a code length, which is returned from the variable-length code table 5 of the decoding circuit 4, and by bit information, which is fed from the code address storing circuit (not shown), to connect code data which are supplied from the buffer memory 2.

Furthermore, since FIG. 1 shows only a principal part of FIG. 1 of the above described prior document (Japanese Patent Application No. 8-275162), the code address storing circuit, a block counting circuit and so forth are not shown.

According to this conventional image decoding system, it is possible to omit the memory for temporarily storing concatenated data. However, there is a disadvantage in that accesses to the buffer memory 2 for holding data (3040 bits) for one video segment frequently and irregularly occur to occupy a bus.

Because a system for sequentially supplying data to the barrel shifter "by a space" which is formed by decoding a variable-length code (the supply of data from the buffer memory is carried out every 8 bits) is adopted. For that reason, from the standpoint of the fact that a memory band width is insured, the buffer memory must be substantially separated from the main memory to be insured, so that the memory saving effect is reduced.

Particularly in recent years, in order to further save memories, it is strongly required to intend to arrange data, which are to be decoded, on a main memory to reduce a buffer memory. However, the number of accesses to the main memory increases, so that the determination of the buffer size is an important matter which has a great influence on performance.

After the coding scheme of the DV format was analyzed in detail, the inventors founded that, even if the contents of a processing appear a variable-length code data processing at first sight, a processing for dividing data into formats similar to a 112-bit fixed length processing can be actually carried out. If the size of the buffer memory is fixed to this length and if a memory access is carried out every this length, the degree of occupancy of the memory bus can be greatly reduced.

SUMMARY OF THE INVENTION

It is therefore an object of the present invention to eliminate the aforementioned problems and to provide a coded image data decoding system, method and program capable of reducing the frequency of memory accesses while saving a memory region by processing a variable-length code string in a depacking process as, e.g., the repetition of 112-bit fixed length processing.

In order to accomplish the aforementioned and other objects, according to a first aspect of the present invention, there is provided a coded image data decoding system for depacking and variable-length decoding image data packed by an image compressing/decompressing format wherein the sum of the length of components other than variable-length code components in one block and the length of an end code is not shorter than a bit length obtained by subtracting 1 bit from the number of bits of the maximum length of variable-length code words, the coded image data decoding system comprising: memory means for storing code strings for one video segment; decoding means for variable-length decoding code strings outputted from the memory means; block storing means, provided between the memory means and the decoding means so as to be capable of storing code strings for one block, for storing code strings for concatenated two blocks; and depacking means, including the block storing means, for suitably combining required portions of sequentially supplied code strings to complete code strings for one block when code strings supplied from the memory means are not code strings for one block.

In the memory means, image data for one video segment, which have been packed by a predetermined format, have been stored. The depacking means including the block storing means is designed to carry out a depacking process by the opposite process to a packing process, by sequentially combining required portion to make code strings for one block when code strings supplied from the memory means are not code strings for one block, and supply the depacked code strings to the decoding means by which the supplied code strings are decoded.

Furthermore, in the coded image data decoding system according to the first aspect, code string concatenating means capable of inputting two block storing means may be inserted into an input of the block storing means, and one of the inputs being connected to the block storing means, and the other input being connected to the memory means.

In addition, in the coded image data decoding system according to the first aspect, the contents of the block storing means may be rewritten in the memory means with respect to a block in which a block end code indicative of the end of the block has not been detected.

According to a second aspect of the present invention, there is provided a coded image data decoding method comprising the steps of: storing code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words; fetching the code strings for at least one block at a time; determining whether the fetched code strings for one block are arranged as a lump of block before depacking; decoding the code strings for the block when the determined block is the lump of block before depacking; sequentially taking the code strings in blocks for the one video segment to concatenate code strings for the lump of block before depacking when the fetched code strings for one block are not arranged as the lump of block before depacking; and decoding the concatenated code strings for one block.

According to a third aspect of the present invention, there is provided a coded image data decoding program comprising: a procedure for storing code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words; a procedure for fetching the code strings for at least one block at a time; a procedure for determining whether the fetched code strings for one block are arranged as a lump of block before depacking; a procedure for decoding the code strings for the block when the determined block is the lump of block before depacking; a procedure for sequentially taking the code strings in blocks for the one video segment to concatenate the code strings for the lump of block before depacking when the fetched code strings for one block are not arranged as the lump of block before depacking; and a procedure for decoding the concatenated code strings for one block.

BRIEF DESCRIPTION OF THE DRAWINGS

In the drawings:

FIG. 3 is a table showing an image decoding system and method according to the present invention as compared with general and conventional image decoding systems and methods;

FIG. 9A is a block diagram showing a processing for reading a code between the register 15 and the main memory 11 in the procedure for processing third through sixth blocks in the first stage, FIG. 9B is a block diagram showing the number of bits of the address storing circuit, and FIG. 9C is a block diagram showing an ending flag of the ending flag memory;

FIG. 10A is a block diagram showing a processing for reading a code between the register 15 and the main memory 11 in the procedure for concatenating the first block to the second block in a second stage, FIG. 10B is a block diagram showing the number of bits of the address storing circuit, and FIG. 10C is a block diagram showing an ending flag of the ending flag memory;

FIG. 11A is a block diagram showing a processing for reading a code between the register 15 and the main memory 11 in the procedure for concatenating the first block to the second block in a second stage, FIG. 11B is a block diagram showing the number of bits of the address storing circuit, and FIG. 11C is a block diagram showing an ending flag of the ending flag memory;

FIG. 12B is a block diagram showing the number of bits of the address storing circuit, and FIG. 12C is a block diagram showing an ending flag of the ending flag memory;

FIG. 13B is a block diagram showing the number of bits of the address storing circuit, and FIG. 13C is a block diagram showing an ending flag of the ending flag memory;

FIG. 14B is a block diagram showing the number of bits of the address storing circuit, and FIG. 14C is a block diagram showing an ending flag of the ending flag memory;

FIG. 15B is a block diagram showing the number of bits of the address storing circuit, and FIG. 15C is a block diagram showing an ending flag of the ending flag memory;

FIG. 16B is a block diagram showing the number of bits of the address storing circuit, and FIG. 16C is a block diagram showing an ending flag of the ending flag memory;

FIG. 17B is a block diagram showing the number of bits of the address storing circuit, and FIG. 17C is a block diagram showing an ending flag of the ending flag memory;

DESCRIPTION OF THE PREFERRED EMBODIMENTS

Referring now to the accompanying drawings, the preferred embodiments of a coded image data decoding system, method and program according to the present invention will be described below in detail. Before describing concrete preferred embodiments, referring to FIG. 2, the first preferred embodiment of a coded image data decoding system according to the present invention, which is based on a first basic construction of the present invention, will be described.

Figure 2:
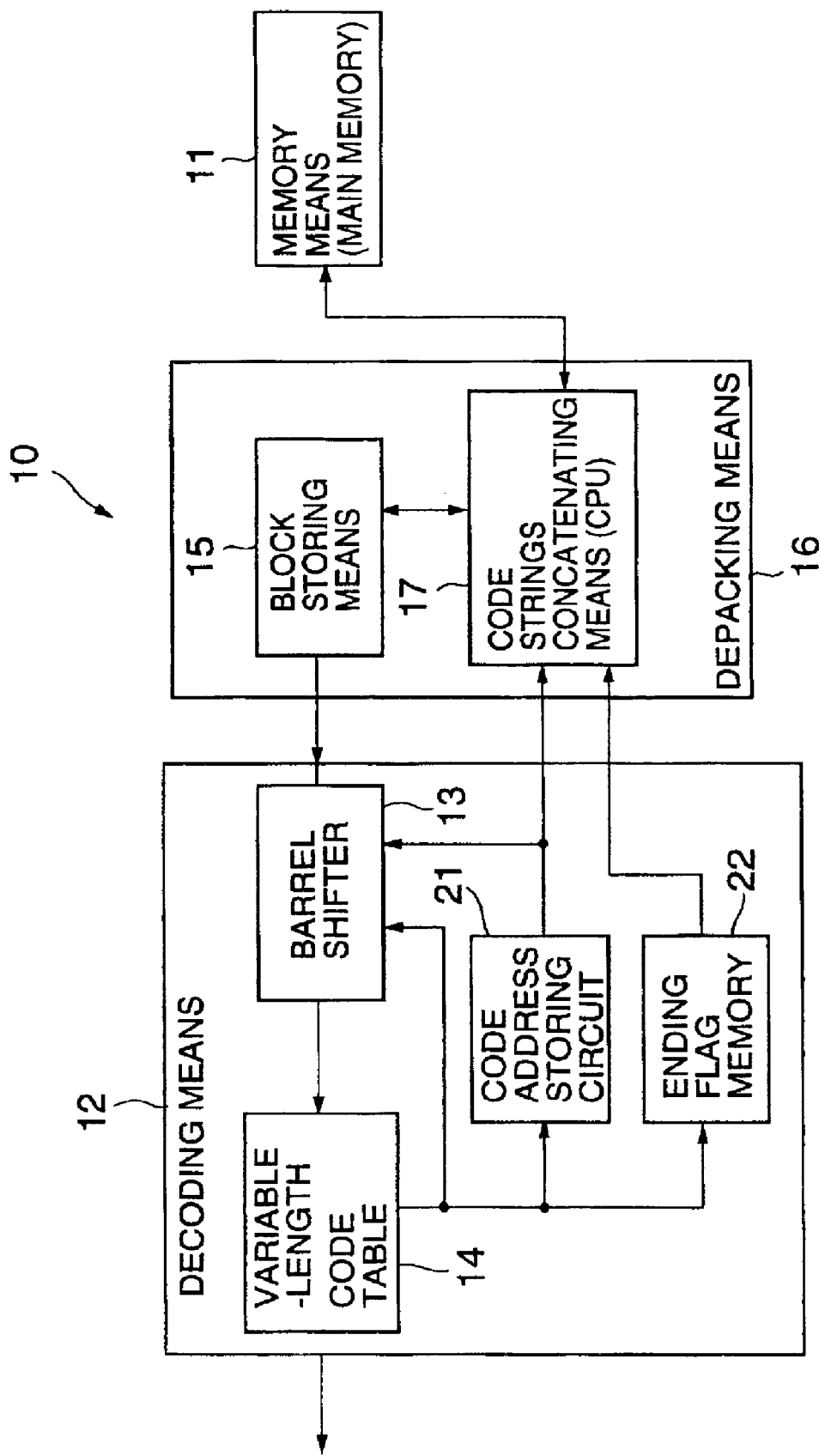
FIG. 2 is a block diagram showing the construction of the first preferred embodiment of a coded image data decoding system according to the present invention as a basic concept of the present invention.

FIG. 2 is a block diagram showing the construction of the first preferred embodiment of a coded image data decoding system according to the present invention. The first preferred embodiment of the coded image data decoding system according to the present invention is a coded image decoding system for depacking and variable-length decoding image data packed by an image compressing/decompressing format wherein the sum of the length of components other than variable-length code components in one block and the length of an end code (EOB) is equal to or more than a bit length obtained by subtracting 1 bit from the number of bits of the maximum length of a variable-length code word.

In FIG. 2, the decoding system 10 basically comprise: memory means 11 in which code strings for one video segment have been stored; decoding means 12 for variable-length decoding code strings outputted from the memory means 11; block storing means 15 which is provided between the memory means 11 and the decoding means 12 so as to be capable of storing code strings for one block and which stores code strings for concatenated two blocks; and depacking means 16 which includes the block storing means 15 and which suitably combines required portions of code strings sequentially supplied when code strings supplied from the memory means 11 are not code strings for one block, to complete code strings for one block to supply the completed code strings to the decoding means 12.

Figure 1:
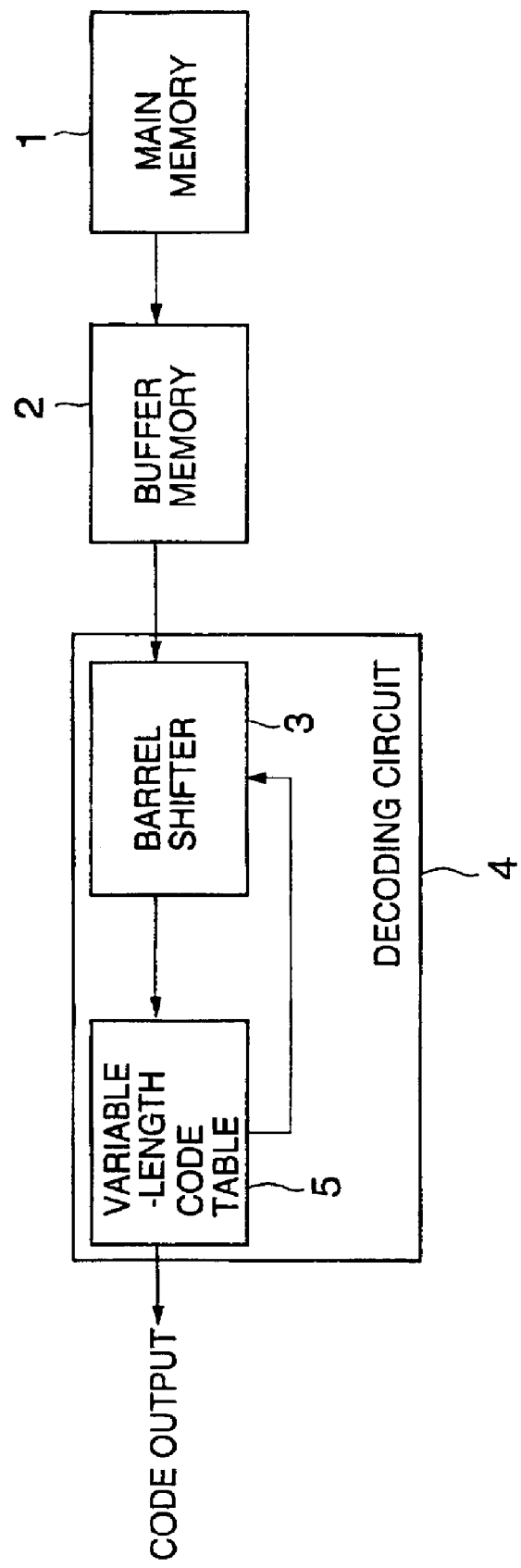
FIG. 1 is a block diagram showing the schematic construction of a conventional coded image data decoding system.

The decoding means 12 comprises a barrel shifter 13 and a variable-length code table 14 similar to the conventional decoding circuit 2 shown in FIG. 1, and further comprises an ending flag memory 22 and a code address storing circuit 21. The flag memory 22 is designed to store a flag, which indicates whether the decoding of an area ends at the EOB, every area. The code address storing circuit 21 is designed to store what number of bit of what number of byte the decoding of codes in the area ends (expressed by the number of the remaining bits in the figure).

In the above described construction, the barrel shifter 13 is designed to shift code data, which have not been decoded by the code length returned from the variable-length code table 14 of the decoding means 12 and by bit information from the code address storing circuit 21, with respect to code strings for one block which has been outputted from the block storing circuit 145 and which is lumped before depacking, to connect the code data supplied from the block storing means 15. Therefore, the operation of the decoding means 12 including the operation of the flag memory and code address storing circuit corresponds to the operation of the conventional decoding circuit 4.

By the above described construction, according to the decoding system in the first preferred embodiment, it is possible to cope with a case where the memory capacity of the block storing means 15 comprising, e.g., a buffer register, is a small capacity of, e.g., about 112 bits, so that the memory capacity of the block storing means 15 can be far smaller than that in general methods and/or conventional decoding systems having a buffer. In addition, the frequency of accesses to the memory means 11 comprising, e.g., a main memory, can be lower than that in conventional decoding systems having no buffer.

FIG. 3 is a table showing this state as compared. As shown in this table, there are more excellent effects than those of general methods and conventional systems, on both sides of the saving of the buffer memory capacity and the frequency of accesses to the main memory. The object of the present invention is to provide a decoding circuit system capable of reducing the frequency of memory accesses while saving memories by causing the processing for variable-length code strings to result in "the repetition of a fixed-length (112 bits) processing" in a depacking process. It can be seen that there are conspicuous effects even if the most basic decoding system in the first preferred embodiment is compared with the conventional decoding system.

Referring to FIGS. 4 through 17, the second preferred embodiment of a coded image data decoding system according to the present invention as a more concrete preferred embodiment will be described below in detail.

Figure 4:
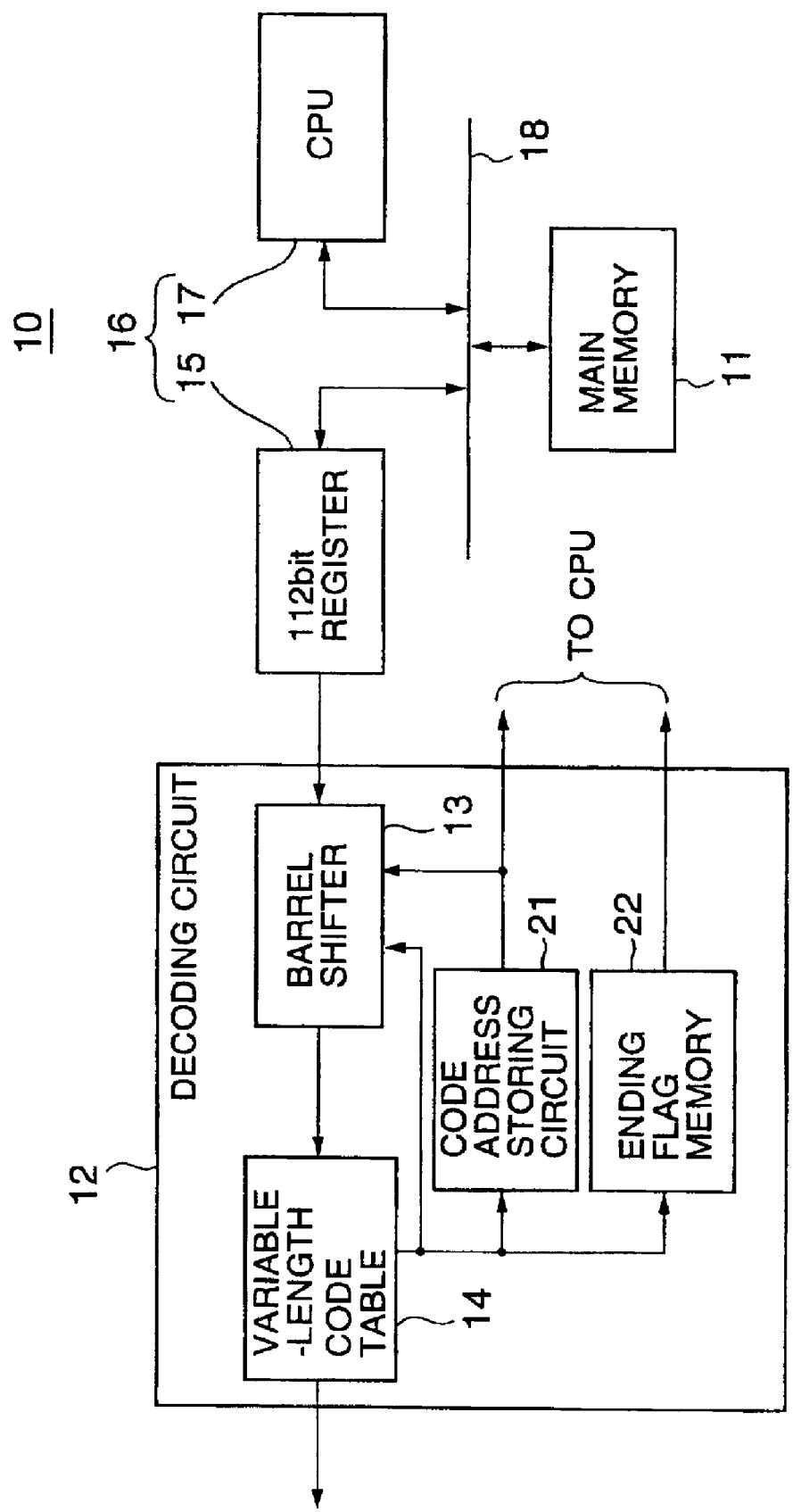
FIG. 4 is a block diagram showing the construction of the second preferred embodiment of a coded image data decoding system according to the present invention.

The second preferred embodiment of a coded image data decoding system according to the present invention is shown in FIG. 4. In FIG. 4, elements to which the same reference numbers as those in FIG. 2 are the same as or correspond to elements of the decoding system in the first preferred embodiment shown in FIG. 2.

In FIG. 4, the coded image data decoding system 10 in the second preferred embodiment comprise: a main memory 11 for storing coded image data for one video segment; a decoding circuit 12 for decoding coded image data supplied from the main memory 11; a 112-bit register 15 for reading the coded image data for one block out of the main memory 11; a CPU 17 for controlling a depacking process so as to concatenate to data for one block, which have been a lump of coded data before the data for one block is read out of the main memory 11 by the register 15 to be packed; and a data bus 18 for mediating the transmission of coded data between the main memory 11 and the register 15. In the decoding system 10 in this second preferred embodiment, the register 15 and the CPU 17 constitute depacking means 16.

The decoding circuit 12 has the same construction as that of the decoding means 12 in the first preferred embodiment shown in FIG. 2. Specifically, the decoding circuit 12 comprises a barrel shifter 13, a variable-length code table 14, a code address storing circuit 21 and an ending flag memory 22. The operation of each of these elements for decoding variable-length codes is the same as the operation of the decoding means 12 in the first preferred embodiment described in FIG. 2, so that duplicate descriptions are omitted.

Figure 5:
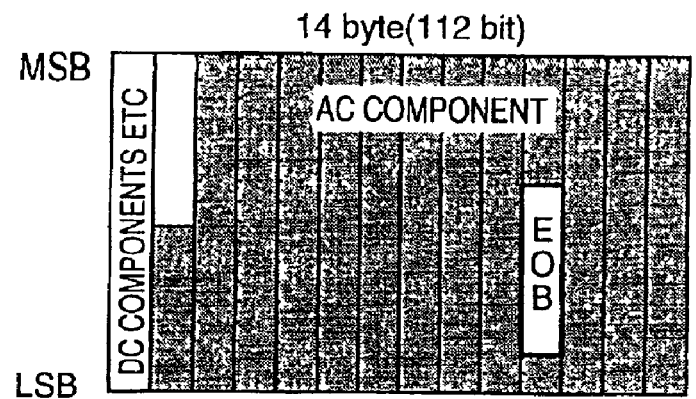
FIG. 5 is an illustration schematically showing the stored state of code data in a register 15 of FIG. 4.
Figure 6A:
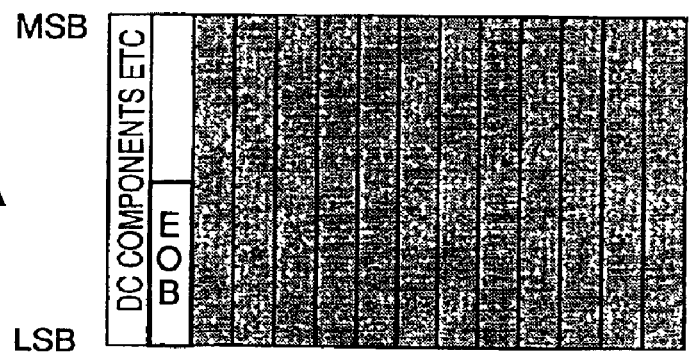
FIGS. 6A and 6B are illustrations schematically showing the stored state of code data similar to FIG. 5, FIG. 6A showing the longest reminder in the case of a first pattern in which EOB is detected, and FIG. 6B showing the longest reminder in the case of a second pattern in which EOB does not exist.
Figure 6B:
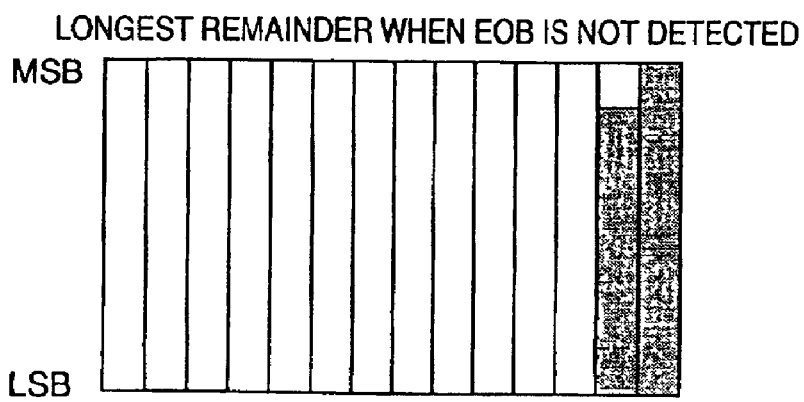

In the decoding system in the second preferred embodiment with the above described construction, the 112-bit length register 15 is provided between the main memory 11 and the barrel shifter 13. Referring to FIG. 5, the data structure of coded image data will be described. Code strings for one video segment (about 3040 bits) have been stored in the main memory 11, and sequentially read out by the 112-bit register to be processed therein in accordance with the following procedure. The specification of the DV format defines that the capacity of four blocks for a luminance component (Y) is 112 bits (14 bytes) and the capacity of two blocks for color difference components (Cr, Cb) is 80 bits (10 bytes). Since processing other than capacity is common, so that the same data structure/hardware can be shared. In this coding system in the second preferred embodiment, the CPU is designed to carry out the concatenation of code strings which will be described later, in addition to the whole control. In addition, the CPU has a small memory region for control.

In view of the above described data structure, the depacking means 16 is designed to carry out a depacking process in accordance with first through third stage procedures which will be described later. Referring to the illustrations of FIGS. 6A and 6B in addition to FIG. 5, the depacking process in the decoding system in the second preferred embodiment will be described below. In FIG. 5, each of vertically extending columns shows data for one byte, i.e., 8 bits, and a fixed-length data part for DC components and so forth has been assigned to the first 12-bit portion of data for one block.

First, in the first stage procedure, data for each block are read out by the register 15 to be sequentially supplied to the barrel shifter, and it is detected whether the read block is a block of a first pattern, which includes an end of block (EOB) code indicative of the end of the block, or a block of a second pattern which does not include the EOB code. If the block read by the register 15 is a block of the first pattern, an ending flag corresponding to the block is set, and code strings subsequent to the EOB code are not decoded and remain as they are. If the block read by the register 15 is a block of the second pattern, i.e., a block in which the EOB code has not been detected, only the last code word which is cut in the middle thereof remains, so that code words up to the last code word are outputted to the barrel shifter 13.

Then, as the second stage procedure, one of blocks of the first pattern including the EOB code and one of the blocks of the second pattern including no EOB code are selected to be concatenated so that the block of the first pattern is arranged at the back, and stored in the register 15, and thereafter, the above described first stage procedure is repeated. As a result, the block of the second pattern in which the EOB code has been detected is emptied to set an end flag, and the next block of the first or second pattern is read. If the EOB code is not detected in codes in the read block, the remaining blocks are rewritten to be the blocks of the second pattern s, and the blocks of the first pattern are emptied. Then, the next block of the first or second pattern is read.

In the third stage procedure, the above described second stage procedure is repeated in the same video segment, and subsequently, the depacking and decoding processing for code strings of blocks in the video segment. The processing for the code strings in the video segment is completed, the processing for code strings in the next video segment is sequentially carried out every block, so that the processing for all of code strings is carried out.

Furthermore, in the end of the second stage procedure, with respect to the processing for reading the next block of the first or second pattern after the block of the first pattern is emptied, the operation of the rewriting process based on improved different techniques also exist, so that the details will be described later.

In addition, by the first through third stage procedures, the depacking and the variable-length decoding simultaneously end. Since this procedure is slightly complicated, it will be described as a concrete example. Referring to FIGS. 7 through 17 while referring to the block structure of the DV format shown in FIG. 5, the procedure will be described below. In addition, the code address storing circuit 21 and ending flag memory 22 described in FIG. 5 correspond to the "code address storing circuit" and "flag memory" in the conventional decoding circuit (Japanese Patent Laid-Open No. 8-275162), respectively. In this second preferred embodiment, it is assumed that the code address storing circuit 21 and ending flag memory 22 are provided as the internal functions of the CPU. However, it may be considered that the code address storing circuit 21 and ending flag memory 22 are provided as functions attached to the decoding circuit 12 as shown in FIG. 4. Therefore, in FIG. 4, these circuit functions are expressed by broken-line blocks 21 and 22.

Figure 7A:
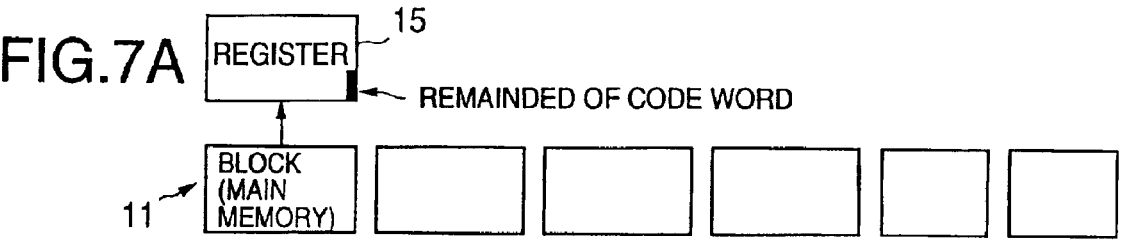
FIG. 7A is a block diagram showing a processing for reading a code between a register 15 and a main memory 11 in the procedure for processing a first block in a first stage.
Figure 7B:
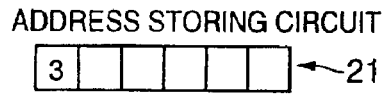
FIG. 7B is a block diagram showing the number of bits of an address storing circuit.
Figure 7C:
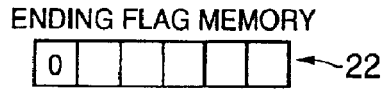
FIG. 7C is a block diagram showing an ending flag of an ending flag memory.

In FIGS. 7 through 9, one video segment is abridged to be shown since the figures are very complicated if the whole video segment comprising 30 blocks should be shown. Since the first and second stage procedures in the depacking process are completed in six blocks in all and in a macro block, the following descriptions will be described every macro block. Referring to FIGS. 7A–7C through FIGS. 9A–9C, the status in the first stage process will be described, and referring to FIGS. 10A–10C through 17A–17C, the second stage procedure will be described.

In FIG. 7, the register 15 first reads the prefix block out of the main memory 11 to sequentially supply code strings from the prefix to the barrel shifter. As a result, since no EOB exists in this block, it can be seen that this block is a block of the second pattern in which the depacking and decoding processes are discontinued. Therefore, only the remaining code words in the last portion, which could not have been decoded, remains in this block. The remaining bits, three bits in this case, are stored in the storage region of the address storing circuit 21 of FIG. 7B as the positions of the remaining code words, and the ending flag memory 22 is set to be "0", without rising.

Figure 8A:
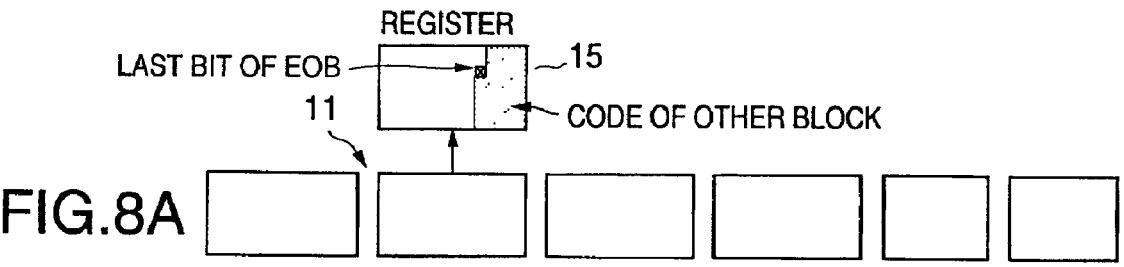
FIG. 8A is a block diagram showing a processing for reading a code between the register 15 and the main memory 11 in the procedure for processing a second block in the first stage.
Figure 8B:
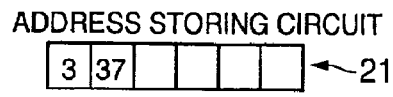
FIG. 8B is a block diagram showing the number of bits of the address storing circuit.
Figure 8C:
FIG. 8C is a block diagram showing an ending flag of the ending flag memory.

Referring to FIGS. 8A through 8C, the decoding and depacking processes in the second block will be described below.

The second block of FIG. 8A is being read by the register 15. Since the EOB exists in the second block, it can be seen that this block is a block of the above described first pattern. Therefore, the depacking and decoding are carried out to the last bit of the EOB, and the processing is discontinued. The number of bits thereof, 37 herein, is stored in the address storing circuit 21 of FIG. 8B, and an ending flag "1" rises in the ending flag memory 22 of FIG. 8C to be stored. Since codes in other blocks have been stored in portions after the EOB in the block which has been read by the register 15 of FIG. 8A, it is not possible to carry out decoding only by codes existing this block.

Then, the third through sixth blocks are decoded using FIGS. 9A through 9C. In FIG. 9A, Since the third block stored in the main memory 11 is a block of the second pattern having no EOB, the number of bits thereof, i.e., 10, is written in the address storing circuit 21 of FIG. 9B. In addition, since the third block is a block of the second pattern, the ending flag can not rise, and "0" is written in the memory 22 of FIG. 9C. Since the fourth block is also a block of the second pattern, the number of bits thereof, i.e., 5, is written in the address storing circuit 21 of FIG. 9C. Since the fifth block is a block of the first pattern, the number of bits thereof, i.e., 19, is written in the address storing circuit 21 of FIG. 9B, and "1" is written in the ending flag memory 22 of FIG. 9C. Since the sixth block is also a block of the first pattern, the number of bits thereof is written in the address storing circuit 21 of FIG. 9B, and "1" is written in the ending flag memory 22 of FIG. 9C.

Referring to FIGS. 10A–10C through FIGS. 16A–16C, the second stage process will be described below.

Since the above described first stage process is usually continuously carried out with respect to one video segment, the first stage process is carried out with respect to all of the first through thirtieth blocks. However, for convenience of explanation, the second stage process will be described using six blocks similar to a case where the decoding and depacking processes are carried out with respect to the first through sixth blocks.

As a concrete example in the second stage, it is shown that concatenation and decoding processes in the second stage are carried out with respect to the remaining blocks after the depacking and decoding processes in the first stage, in order to facilitate better understanding of the contents of the processes. In fact, the contents of the memory 11 have not been updated, and the decoded portions have not been cleared. The positions of delimiters can be known from the contents of the address storing circuit 21. In the following descriptions, the contents of the memory 11 are not updated unless updating is particularly specified.

FIGS. 10A through 10C show a state that the initial two blocks are concatenated in the register 15, and FIGS. 11A through 11C show a state after the concatenated blocks in the register 15 are decoded. Therefore, FIGS. 11B and 11C show the first and second columns of the address storing circuit 21, which have been rewritten after concatenation and decoding, and the first column of the ending flag memory 22 in which the ending flag "1" has risen.

As shown in FIGS. 10A through 10C, blocks of the first and second patterns are fetched one by one to be concatenated in the register 15. In the block of the first pattern, "1" has risen in the ending flag memory, whereas in the block of the second pattern, "0" is written. Furthermore, the block of the first pattern means a block wherein the ending flag "1" rises and the contents of the address storing circuit 21 are not zero, and the block of the second pattern means a block wherein the ending flag "1" does not rise. When blocks of two kinds of patterns are concatenated in the register 15, the block of the second pattern is always arranged in front.

Then, as shown in FIG. 11A, the EOB code has been detected in codes stored in the register 15. If codes in the register 15 are decoded, the first column of the address storing circuit 21 corresponding to the block of the second pattern is "0" as shown in FIG. 11B, and the ending flag "1" rises in the first block of the ending flag memory 22 as shown in FIG. 11C. Since the second block has been decoded by 30 bits after the decoding and depacking processes in the first stage, the number of remaining bits in decoding, i.e., 7, is written in the second column of the address storing circuit 21. Furthermore, although FIG. 11A shows that the contents of the register 15 are reflected in the second block, the contents of the memory have not been updated in fact.

FIGS. 12A–12C and FIG. 13A–13C show a concatenating and decoding process with respect to the next two blocks, which have not been concatenated and decoded in the memory 11, i.e., the second and third blocks.

Figure 12A:
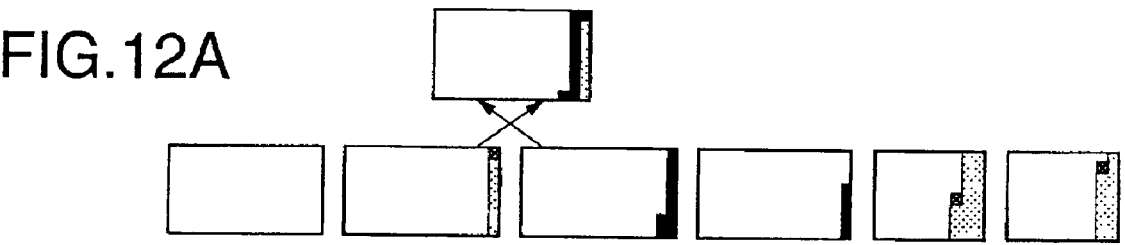
FIG. 12A is a block diagram showing a processing for reading a code between the register 15 and the main memory 11 in the procedure for concatenating the second block to the third block in the second stage.

In the next concatenating and decoding process, the next two blocks of different patterns are concatenated so that the block of the second pattern is arranged in front as shown in FIG. 12A. Comparing the second block with the third block in FIG. 12A, the block of the second pattern is the third block. Therefore, as shown in the figure, the blocks are concatenated in the resister 15 so that codes in the third block are arranged in front and codes after the EOB in the second block are arranged in the rear of the codes in the third block. Then, the codes stored in the register 15 are decoded.

Figure 13A:
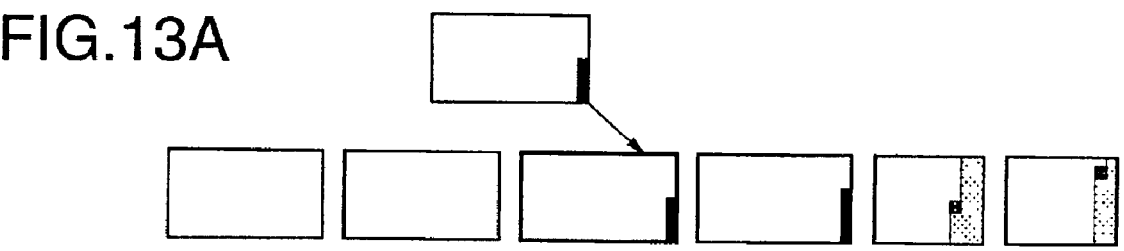
FIG. 13A is a block diagram showing a processing for rewriting a code in the main memory 11 from the register 15 in the procedure for concatenating the second block to the third block in the second stage.

The state after the decoding is shown in FIGS. 13A through 13C. The register 15 includes only the remaining four bits after the decoding, and any EOB has not been detected. Since the decoding process is completed up to the second block of the main memory 11, the second column of the address storing circuit 21 has "0" bit indicative of the fact that the decoding is completed, and the third column is rewritten from "10" bits to "4" bits which are the remaining bits after the decoding, as shown in FIG. 13B. Although the contents of the memory 11 are not updated in fact, the third block can be treated as a block having the remaining four bits including no EOB.

Figure 14A:
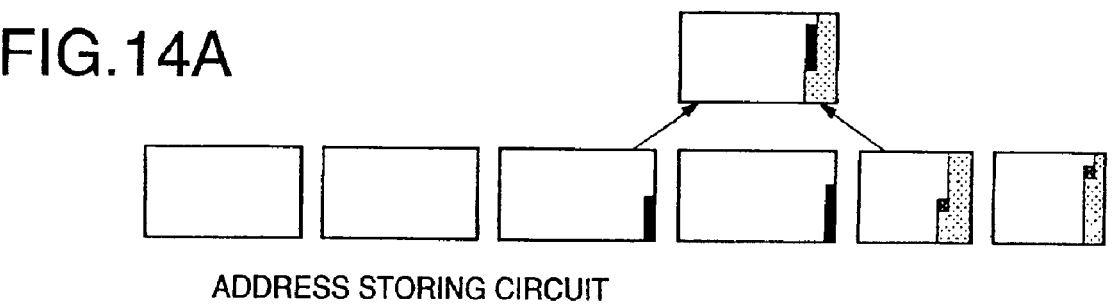
FIG. 14A is a block diagram showing a processing for reading a code between the register 15 and the main memory 11 in the procedure for concatenating the third block to the fifth block in the second stage.
Figure 15A:
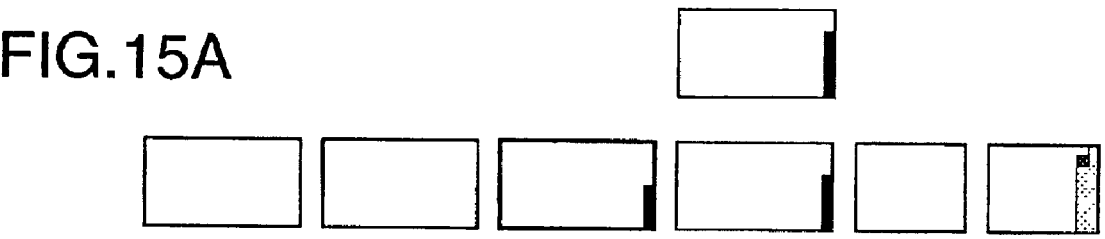
FIG. 15A is a block diagram showing a processing for rewriting a code in the main memory 11 from the register 15 in the procedure for concatenating the third block to the sixth block in the second stage.
Figure 16A:
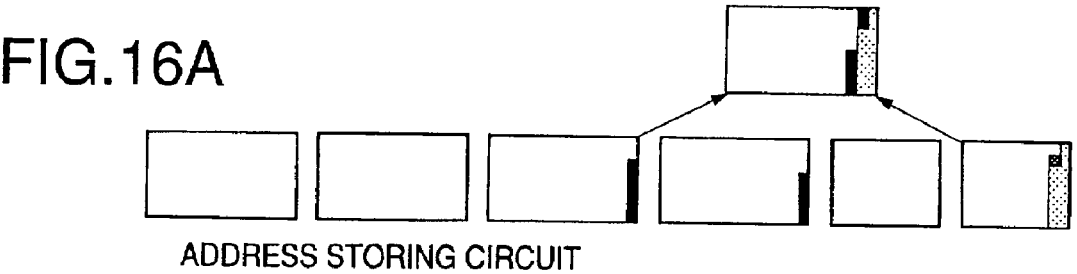
FIG. 16A is a block diagram showing a processing for reading a code between the register 15 and the main memory 11 in the procedure for concatenating the third block to the sixth block in the second stage.

Then, comparing the next two blocks of the main memory 11, the third and fourth blocks are blocks of the second pattern including no EOB, so that these two blocks can not be concatenated. Therefore, as shown in FIG. 14A, the third and fifth blocks are concatenated so that the block of the second pattern is arranged in front. Since the contents stored in the address storing circuit 21 and ending flag memory 22 of FIGS. 14B and 14C are not changed in a state that only the concatenation is carried out, the contents are the same as those in FIGS. 13B and 13C.

Then, the concatenated third and fifth blocks are decoded. Codes after the EOB in the fifth block are decoded, and codes of 6 bits remain in the register 15. Therefore, the decoded "0" bit is written in the fifth column of the address storing circuit 21 corresponding to the fifth block of the first pattern, and the remaining codes in the resister 15 are written as "6" bits in the third column of the address storing circuit 21 corresponding to the third block.

Figure 17A:
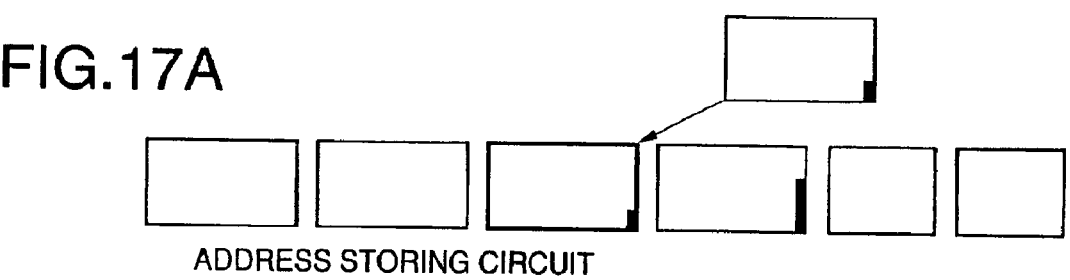
FIG. 17A is a block diagram showing a processing for rewriting a code in the main memory 11 from the register 15 in the procedure for concatenating the third block to the fifth block in the second stage.

Then, with respect to blocks which have not been decoded in the main memory 11, the third, fourth and sixth blocks have not been decoded. Since two blocks to be concatenated have codes of the first and second patterns, the third and sixth blocks are sequentially concatenated in the register 15 as shown in FIG. 17A. If the codes in the register 15 are decoded, only codes of 2 bits remain without being decoded, so that codes of 2 bits remains in the register 15 as shown in FIG. 17A. If it is considered that this is written in the third block of the main memory 11 again, "2" bits are written in the third column of the address storing circuit 21 as shown in FIG. 17B, so that "0" bit remains in the sixth column. As shown in FIG. 17C, in the ending flag memory 22, the ending flag "1" rises in the first, second, fifth and sixth columns, and the ending flag does not rise in the third and fourth columns, so that the decoding of the third and fourth blocks of the main memory 11 corresponding to these two columns has not been completed.

Since the number of blocks in the video segment is 30 as described above, the processes up to the second stage are repeated five times if the decoding and depacking process is carried out with respect to six blocks at a time. Therefore, if the decoding and depacking are sequentially carried out from the front block to carry out the process in the second stage again with respect to blocks which could not have been decoded in the process in the second stage, the depacking and decoding of all of the blocks are completed. This process for carrying out the process in the second stage again after the second stage is the process in the third stage.

Since most of processes are completely carried out in the 112-bit resister if this algorithm is utilized, it is possible to greatly reduce the number of accesses to the main memory while inhibiting the increase of the memory capacity to be used. The reading of code data from the main memory 11 is carried out in the front of the block processing in each of the first, second and third stages, and the writing of code data is carried out when the block processing in each of the second and third stages is completed.

The most important point of this algorithm is that, after the specification of the DV format was studied in detail, it was found that the DV format has a property that "the code length after concatenation is always within 112 bits even if code strings in blocks of the above described first and second patterns are concatenated", and it was positively put to practical use.

A concrete example of numeric values will be described. Since the length of code strings remaining in the block of the first pattern is maximum when an EOB of 4 bits exists immediately after a fixed-length area of a 12-bit DC component and so forth, the maximum code length is 96 bits (=112−4). That is, although "a state that there is only a space of 16 bits" is the maximum code length, the maximum length of code strings remaining in the block of the second pattern is only 15 bits (the maximum length of code words in DV is 16 bits). Therefore, the total is always within one block.

Specifically, in order to allow this algorithm to be applied, the specification of the picture signal compressing format must satisfy the following condition.

> (Length of Codes other than Variable-Length Codes in One Block)+(Length of End Code)>=(Maximum Length of Variable-Length Codes)−1

In addition, the register length required at this time is equal to the length of one block (this can not be less than one block since the above described first stage procedure is carried out). However, if portions (DC component and so forth) other than variable-length codes are separately processed, the register length may be (Length of One Block) −(Length of Codes other than Variable-Length Codes)− (Length of End Code)+(Maximum Length of Variable-Length Code Words) −1. In the case of the DV format, this value is 111 bits.

The above described second stage procedure includes an operation for writing the remaining codes, which have not been decoded, in the main memory 11 again, after codes of two blocks are concatenated to be decoded. It is considered that the load due to this process is very light for the following two reasons.

That is, one of the reasons is that rewritten data always has 15 bits or less, and its position is fixed in the end of the block, so that work can be completed by carrying out a writing operation of 16 bits once.

The other reason is that rewritten data is immediately used unless it is not the end of a macro block, so that the number of rewriting operation can be further reduced by devising the procedure. This reduction can be carried out every macro block up to once. This will be described in the third preferred embodiment in detail, which will be described later.

If the length of rewritten data is short, over flow is prevented during rewriting. The movement of data between blocks having different sizes, such as the movement of data between a luminance block (112 bits) and a color difference block (80 bits), occurs only during the above described rewriting operation. However, since its maximum length is 15 bits, over flow never occurs, so that it is insured that the luminance block and the color difference block can be processed by the same algorithm.

Of course, as shown in FIGS. 2 and 3 of the above described prior art (Japanese Patent Laid-Open No. 8-275162), the rewriting can be omitted by adding the hardware. However, this system must change the hardware every time the specification of packing/depacking increases to the fourth stage, fifth stage, . . . .

Figure 18A:
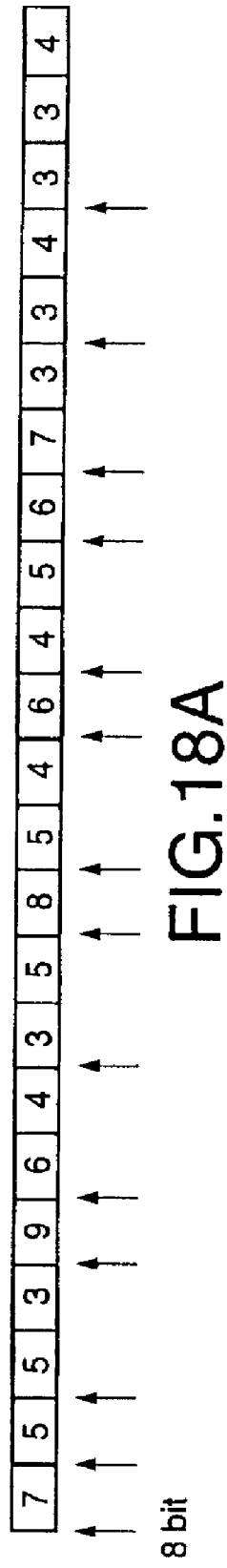
FIG. 18A is an illustration showing the frequency of memory accesses in a conventional case.
Figure 18B:
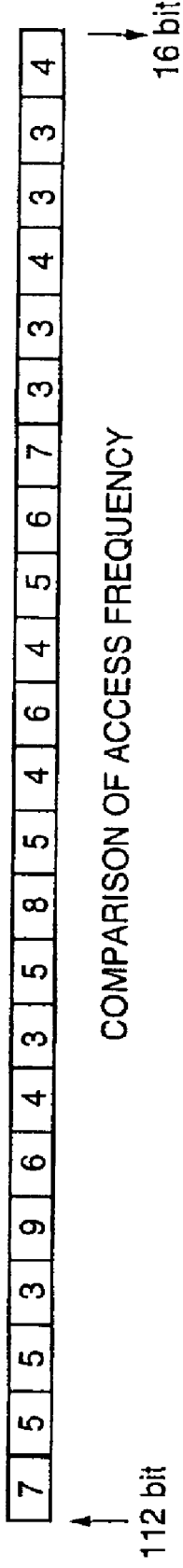
FIG. 18B is an illustration showing the frequency of memory accesses according to the present invention as compared with that in the conventional case.

The state that the frequency of memory accesses is reduced according to the present invention is shown in FIGS. 18A and 18B. FIG. 18A shows the frequency of memory accesses in the prior art, and FIG. 18B shows the frequency of memory accesses according to the present invention as compared with that in the prior art. It can be seen that, if code strings of bit lengths as shown in FIGS. 18A and 18B are inputted, memory accesses (↑ in the figure), each of which has 8 bits, irregularly and frequently occur in the prior art as shown in FIG. 18A, whereas memory accesses occur only in the front and end according to the present invention as shown in FIG. 18B.

Figure 19:
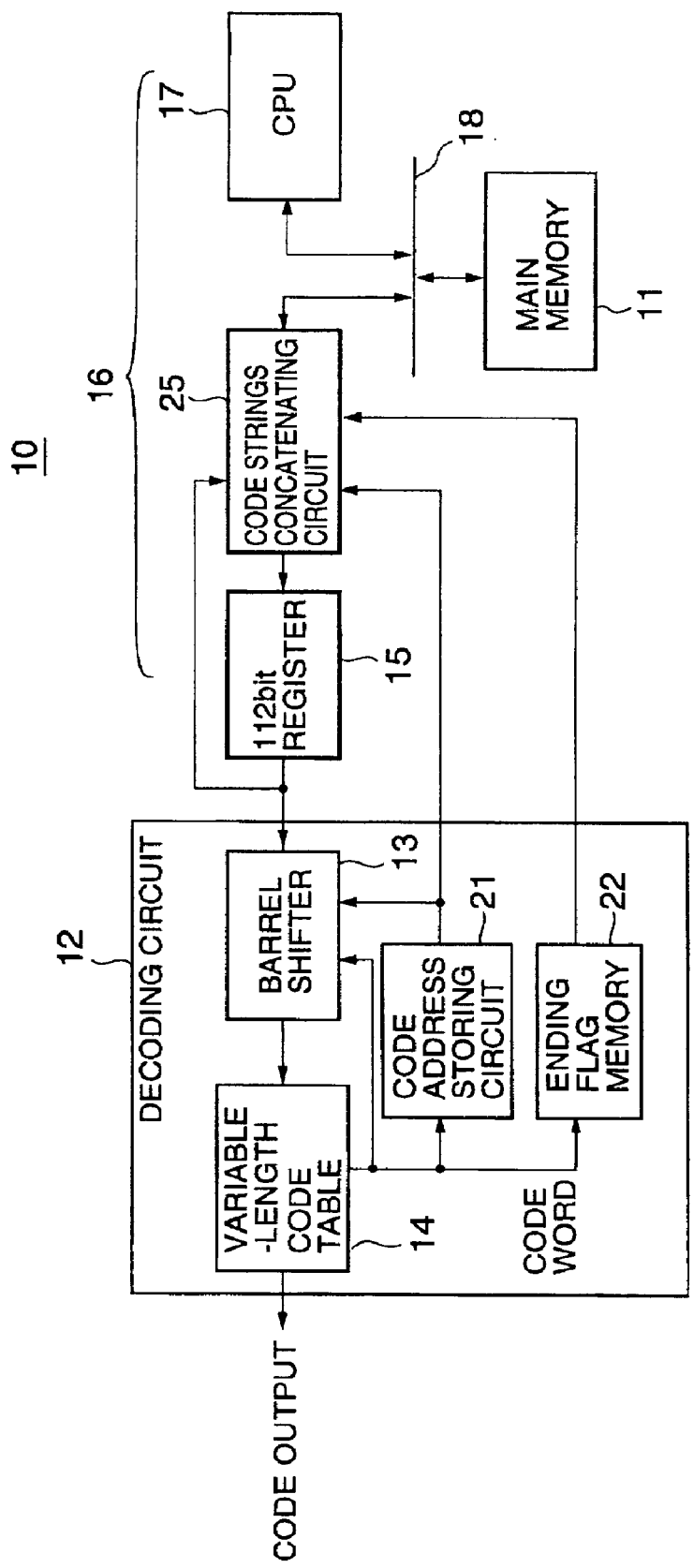
FIG. 19 is a block diagram showing the construction of the third preferred embodiment of a coded image data decoding system according to the present invention.

Referring to FIG. 19, the third preferred embodiment of a coded image data decoding system according to the present invention will be described below in detail.

The decoding system in the third preferred embodiment is provided with a code string concatenating circuit based on a hardware for concatenating two blocks of different patterns as described above. The code string concatenating means 17 in the depacking means 16 of FIG. 2 providing the construction of the first preferred embodiment, which is the principal preferred embodiment of the present invention, is realized by a concrete circuit construction.

In FIG. 19, the data decoding system in the third preferred embodiment is provided with a code string concatenating circuit 25 between a main memory 11 for storing coded image data, and a 112-bit register 15. This concatenating circuit 25 has two inputs, and has the function of bit-shifting and concatenating the output contents of a register 15 and the contents inputted from the memory 11, and rewriting the results in the register 15. Thus, the concatenation of blocks in the second and third stage procedures in the above described second preferred embodiment can be carried out by the hardware construction. Although the concatenated code strings in a block of the first pattern are always arranged in the rear, which code string of "the code string remaining in the resister 15" and "the code string read out of the memory 11" is a code string in a block of the first or second pattern is different on end conditions. Therefore, the concatenating circuit 25 must have the function of being capable of changing the sequence of concatenation on the basis of the fact that the end conditions for the supplied block relate to the first or second pattern.

In the third preferred embodiment, the above described rewriting process in the main memory 11 is reduced. Therefore, the procedure in the depacking process is slightly different from that in the above described second preferred embodiment. Specifically, the second stage procedure and the third stage procedure are modified as follows.

First, in the second stage, blocks corresponding to the first and second patterns in the same macro block are selected "one by one from the prefix", and two code strings are concatenated so that the second pattern is arranged in front and the first pattern is arranged in the rear. Then, after the concatenated code strings are stored in the register 15, the first stage procedure is repeated again.

As a result, if an EOB is detected, the block of the second pattern is emptied, and the ending flag "1" is set. Then, the next block of the second pattern is read. If no EOB is detected, the block of the first pattern is embodied, and the next block of the first pattern is read.

Moreover, if the final block of each macro block is a block of the second pattern, the following process is added. That is, after the third stage process is completed, the remaining code strings are written in the block of the second pattern again. As the third stage process, the above described decoding/depacking in the second stage is repeated in the same video segment similar to the operation of the decoding system in the second preferred embodiment.

In short, if the algorithm in the third preferred embodiment is utilized, traffic around the main memory can be further reduced than the above described second preferred embodiment. The reading operation from the main memory is carried out only in the front of each block processing in each of the first through third stages, and the writing operation is carried out only after each macro block processing in the second stage is completed. In both of the second and third preferred embodiments, the operations can be carried out in parallel by arranging a plurality of registers and a plurality of concatenating circuits in parallel.

Referring to the flow chart of FIG. 20, the fourth preferred embodiment of a coded image data decoding method according to the present invention, which includes processing steps applied to the above described coded image data decoding system in the first through third preferred embodiments, will be described below in detail.

Figure 20:
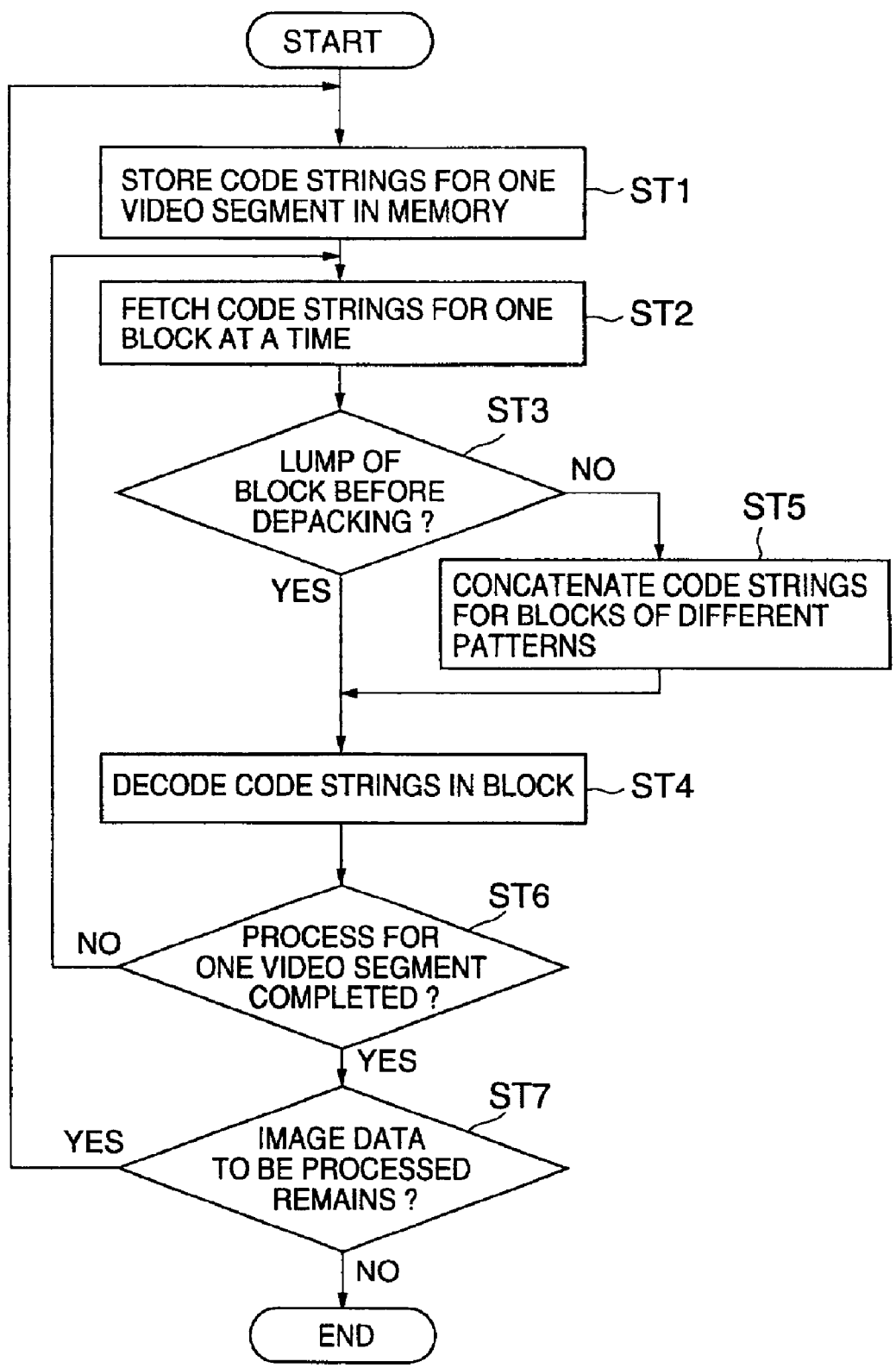
FIG. 20 is a flow chart showing processing steps in the fourth preferred embodiment of a coded image data decoding method according to the present invention.

In FIG. 20, the image data decoding method in the fourth preferred embodiment comprises: a first step ST1 of storing, in a memory, code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words; a second step ST2 of fetching the code strings for at least one block at a time; a third step ST3 of determining whether the fetched code strings for one block are arranged as a lump of block before depacking; a fourth step ST4 of decoding the code strings for the block when the determined block is the lump of block before depacking; and a fifth step ST5 of sequentially taking the code strings in blocks for the one video segment to concatenate code strings for one block when the fetched code strings for one block are not arranged as the lump of block before depacking.

The code strings for one block, which are concatenated at the above described fifth step ST5, are decoded at the above described step ST4, and it is determined at a sixth step whether the depacking and decoding processes for the code strings for one video segment, which are stored at the first step ST1, are completed. If the processes for one video segment have not been completed, the above described second through fifth steps are repeated.

If it is determined at the sixth step ST6 that the process for one video segment is completed, it is determined at a seventh step ST7 whether coded image data to be decoded remains. If it is determined at the seventh step that image data to be decoded remains, the above described first through sixth steps ST1 through ST6 are repeated. If it is determined that image data to be decoded does not remain, the depacking and decoding processes for the coded image data are completed.

Referring to the functional block diagram of FIG. 21, the fifth preferred embodiment of a coded image data decoding program according to the present invention for causing program executing means, such as a central processing unit (CPU) or a microprocessor, to execute the coded image data decoding method in the fourth preferred embodiment will be described below. The respective parts in FIG. 21 show the respective processing procedures in the decoding program.

Figure 21:
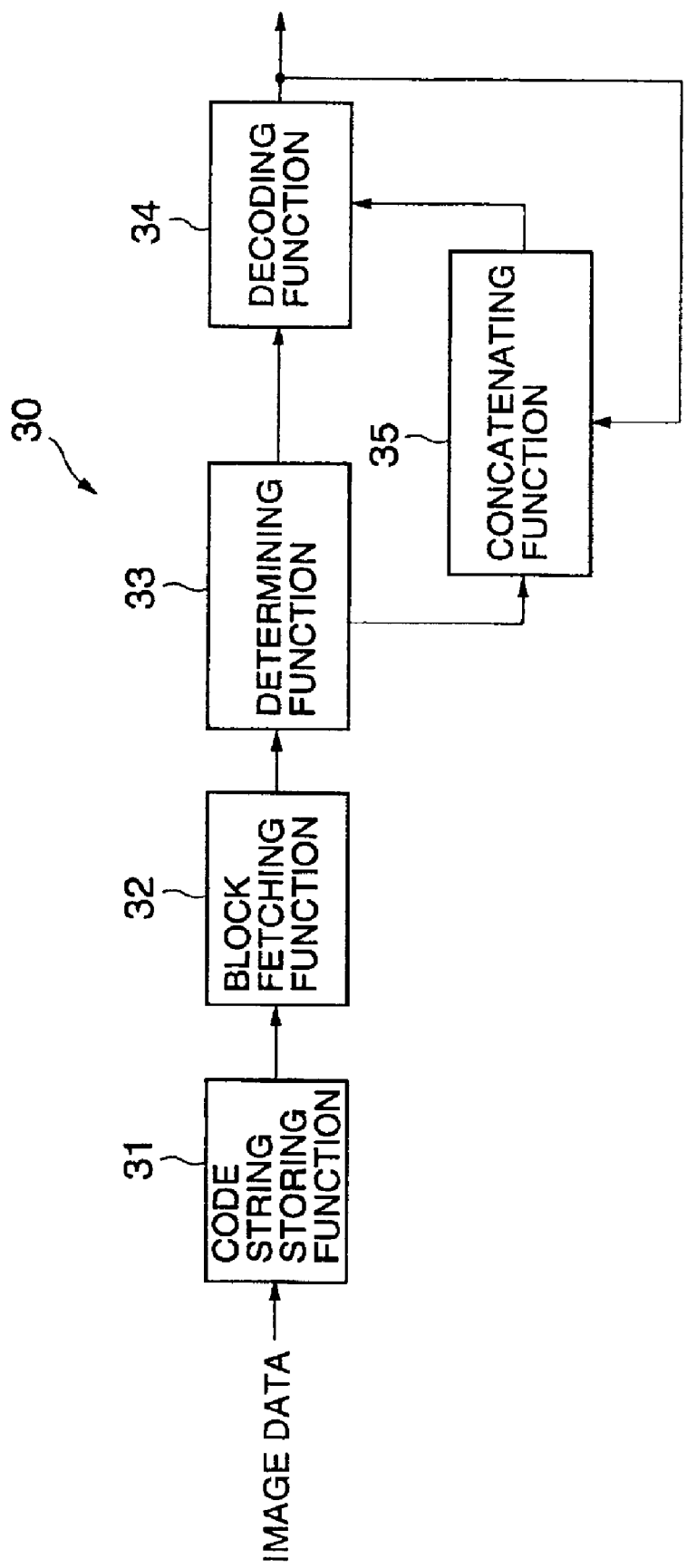
FIG. 21 is a block diagram showing the function and construction of the fifth preferred embodiment of a coded image data decoding program according to the present invention.

In FIG. 21, the decoding program 30 in the fifth preferred embodiment comprises: a code string storing function 31 of storing code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words; a block fetching function 32 of fetching the code strings for at least one block at a time; a determining function 33 of determining whether the fetched code strings for one block are arranged as a lump of block before depacking; a decoding function 34 of decoding the code strings for the block when the determined block is the lump of block before depacking; and a concatenating function 35 of sequentially taking the code strings in blocks for the one video segment to concatenate the taken code strings to code strings, which have not been decoded by the decoding function 34, when the fetched code strings for one block are not arranged as the lump of block before depacking. The code strings for one block, which have been concatenated by the concatenating function 35, are decoded by the decoding function 34 to be code-outputted.

The blocks concatenated in each step and each function of the above described image data decoding method and decoding program in the fourth and fifth preferred embodiments are the blocks of the first and second pattern described in the image data decoding system in the third preferred embodiment, and divided into blocks of the first pattern and blocks of the second pattern by the fact that the blocks include an EOB. Therefore, the processing contents and procedures at the fifth step ST5 or in the concatenating function 35 can be described in more detail by dividing them into the processes in the first through third stages in FIGS. 7 through 17, but they are not described herein in order to prevent duplicate descriptions.

As described above in detail, according to the coded image data decoding system, method and program according to the present invention, it is possible to greatly reduce traffic around a component for storing image data, such as a main memory, without allowing memory accesses to occur during a variable-length decoding process in a component for storing blocks, such as a register, by using a main construction for dividing coded image data for a plurality of blocks for at least one video segment into blocks of a first pattern, which include an end code, and blocks of a second pattern, which include no end code, to concatenate codes in a block, which could not have been decoded in a first stage, to first pattern block codes from second pattern block codes to carry out decoding operations in second and third stages to depack and decode image data.

In addition, since it is possible to concatenate code strings in two blocks by using a hardware construction in order to concatenate code strings in each of a block of a second pattern and a block of a first pattern, it is possible to simplify the processing, and it is possible to further reduce traffic around a component for storing image data, such as a main memory, as compared with the above described main construction.

Moreover, with respect to a block in which a block end code indicative of the end of the block has not been detected, the contents of a component for storing blocks are rewritten in a component for storing image data, so that the image data decoding system, the hardware construction can be used without being changed even if the specification of depacking has four stages or more.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A coded image data decoding system for depacking and variable-length decoding image data packed by an image compressing/decompressing format wherein the sum of the length of components other than variable-length code components in one block and the length of an end code is not shorter than a bit length obtained by subtracting 1 bit from the number of bits of the maximum length of variable-length code words, said coded image data decoding system comprising:

memory means for storing code strings for one video segment;
   decoding means for variable-length decoding code strings outputted from said memory means;
   block storing means, provided between said memory means and said decoding means so as to be capable of storing code strings for one block, for storing code strings for concatenated two blocks; and
   depacking means, including said block storing means, for suitably combining required portions of sequentially supplied code strings to complete code strings for one block when code strings supplied from said memory means are not code strings for one block.

2. A coded image data decoding system as set forth in claim 1, wherein code string concatenating means capable of inputting two block storing means is inserted into an input of said block storing means, and one of the inputs being connected to said block storing means, and the other input being connected to said memory means.

3. A coded image data decoding system as set forth in claim 1, wherein the contents of said block storing means is rewritten in said memory means with respect to a block in which a block end code indicative of the end of said block has not been detected.

4. A coded image data decoding system as set forth in claim 1, which comprises:
   a main memory as said memory means for storing coded image data for one video segment;
   said decoding means for variable-length decoding said coded image data outputted from said main memory;
   said block storing means, provided between said main memory and said decoding means so as to be capable of storing code strings for one block, for storing code strings for concatenated two blocks; and
   depacking means, including said block storing means, for suitably combining required portions of sequentially supplied code strings to complete code strings for one block when code strings supplied from said main memory are not code strings for one block,
   wherein said decoding means comprises:
   a variable-length code table for storing a variable-length code for decoding said code strings for one block outputted from said block storing means; and
   a barrel shifter for bit-shifting data for one block, which are outputted from said block storing means and which have been a lump of coded data before being depacking, on the basis of a code length, which is returned from said variable-length code table, and on the basis of bit information from a code address storing circuit, to supply the bit-shifted data to said variable-length code table.

5. A coded image data decoding system as set forth in claim 4, wherein said depacking means comprises:
   said block storing means, provided between said depacking means and said decoding means, for storing said code strings for concatenated two blocks; and
   code string concatenating means for suitably combining required portions of sequentially supplied code strings to concatenate code strings for one block when code strings supplied from said memory means are not code strings for one block, said code string concatenating means comprising a central processing unit.

6. A coded data decoding system as set forth in claim 4, wherein said decoding means further comprises:
   a flag memory for storing, every area, a flag indicative of the fact that decoding of an area is completed at an EOB; and
   a code address storing circuit for storing what number of bit of what number of byte the decoding of codes in an area ends.

7. A coded image data decoding system as set forth in claim 1, which comprises:
   a main memory for storing coded image data for one video segment;
   decoding means for decoding said coded image data supplied from said main memory;
   depacking means comprising a register for reading coded image data for one block out of said main memory, and a CPU for controlling a depacking process so as to concatenate data for one block, which are read out of said main memory, to data for one block, which have been a lump of coded data before depacking said data for one block read by said register; and
   a data bus for mediating the transmission of coded data between said main memory and said register, wherein said decoding circuit comprises:
a variable-length code table for storing a variable-length code for decoding said code strings for one block outputted from said register; and
a barrel shifter for bit-shifting data strings for one block, which are outputted from said register and which are a lump of code strings before being depacking, on the basis of a code length, which is returned from said variable-length code table, and on the basis of bit information from a code address storing circuit, to supply the bit-shifted data to said variable-length code table.

8. A coded data decoding system as set forth in claim 7, wherein said decoding means further comprises:
a flag memory for storing, every area, a flag indicative of the fact that decoding of an area is completed at an EOB; and
a code address storing circuit for storing what number of bit of what number of byte the decoding of codes in an area ends.

9. A coded image data decoding system as set forth in claim 1, which comprises:
a main memory for storing coded image data for one video segment;
decoding means for decoding said coded image data supplied from said main memory;
depacking means comprising a register for reading coded image data for one block out of said main memory, a code string concatenating circuit having two inputs and including the function of bit-shifting and concatenating the output contents of said register and the contents, which are inputted from said memory, to rewrite the results in said register and the function of being capable of changing the sequence of concatenation on the basis of the fact that the end conditions for a supplied block relate to first or second pattern, and a CPU for controlling a depacking process so that said register reads data for one block out of said main memory and said code string concatenating circuit concatenates the read data to data for one block; and
a data bus for mediating the transmission of coded data between said main memory and said depacking means,
wherein said decoding circuit comprises:
a variable-length code table for storing a variable-length code for decoding said code strings for one block outputted from said register; and
a barrel shifter for bit-shifting data strings for one block, which are outputted from said register and which are a lump of code strings before being depacking, on the basis of a code length, which is returned from said variable-length code table, and on the basis of bit information from a code address storing circuit, to supply the bit-shifted data to said variable-length code table.

10. A coded data decoding system as set forth in claim 9, wherein said decoding means further comprises:
a flag memory for storing, every area, a flag indicative of the fact that decoding of an area is completed at an EOB; and
a code address storing circuit for storing what number of bit of what number of byte the decoding of codes in an area ends.

11. A coded image data decoding system as set forth in claim 1, wherein said block storing means comprises a buffer register capable of storing code data of 112 bits, and the frequency of accesses to said memory means is low.

12. A coded image data decoding system as set forth in claim 11, wherein the access of said 112-bit buffer register to a main memory serving as said memory means is only to read code data of 112 bits once to supply data of 16 bits.

13. A coded image data decoding method comprising the steps of:
storing code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words;
fetching said code strings for at least one block at a time;
determining whether the fetched code strings for one block are arranged as a lump of block before depacking;
decoding the code strings for the block when the determined block is the lump of block before depacking;
sequentially taking said code strings in blocks for the one video segment to concatenate code strings for the lump of block before depacking when the fetched code strings for one block are not arranged as the lump of block before depacking; and
decoding the concatenated code strings for one block.

14. A coded image data decoding method as set forth in claim 13, wherein said step of concatenating code strings inputs code strings so as to be capable of inputting two blocks, and decodes image data for additional one block to sequentially concatenate the code strings while storing image data for one block.

15. A coded image data decoding method as set forth in claim 13, wherein the contents of a block, in which a block end code indicative of the end of the block has not been detected, are temporarily rewritten in a memory.

16. A coded image data decoding method as set forth in claim 13, wherein said code strings for one video segment are read by a main memory to be processed, and said code strings for one block are processed by a 112-bit buffer register, the frequency of accesses between the main memory and the buffer register being low.

17. A coded image data decoding program comprising:
a procedure for storing code strings for at least one video segment in image data packed by an image compressing/decompressing format wherein the sum of the length of components other than variable-length code components in one block and the length of an end code is not shorter than a bit length obtained by subtracting 1 bit from the number of bits of the maximum length of variable-length code words;
a procedure for fetching said code strings for at least one block at a time;
a procedure for determining whether the fetched code strings for one block are arranged as a lump of block before depacking;
a procedure for decoding the code strings for the block when the determined block is the lump of block before depacking;
a procedure for sequentially taking the code strings in blocks for the one video segment to concatenate the code strings for the lump of block before depacking when the fetched code strings for one block are not arranged as the lump of block before depacking; and
a procedure for decoding the concatenated code strings for one block.

18. A coded image data decoding program as set forth in claim 17, wherein said procedure for concatenating code strings inputs code strings so as to be capable of inputting two blocks, and decodes image data for additional one block to sequentially concatenate the code strings while storing image data for one block.

19. A coded image data decoding program as set forth in claim 17, wherein the contents of a block, in which a block end code indicative of the end of the block has not been detected, are temporarily rewritten in a memory.

20. A coded image data decoding program as set forth in claim 19, wherein said code strings for one video segment are read by a main memory to be processed, and said code strings for one block are processed by a 112-bit buffer register, the frequency of accesses between the main memory and the buffer register being low.

* * * * *